United States Patent Office 3,060,220
Patented Oct. 23, 1962

3,060,220
VINYL ESTER OF 1,4,5,6,7,7-HEXACHLOR-BICYCLO-(2,2,1)-HEPTENE-(5)-2-CARBOXYLIC ACID
Manfred Minsinger, Ludwigshafen (Rhine), and Herbert Friederich, Worms (Rhine), Germany, assignors to Badische Anilin- & Soda-Fabrik Aktiengesellschaft, Ludwigshafen (Rhine), Germany
No Drawing. Filed Sept. 10, 1959, Ser. No. 839,063
Claims priority, application Germany Sept. 24, 1958
1 Claim. (Cl. 260—468)

This invention relates to a new compound and to a process for the production thereof.

We have found that 1,4,5,6,7,7-hexachlor-bicyclo-(2,2,1)-heptene-(5)-2-carboxylic acid vinyl ester is obtained by reacting hexachlorcyclopentadiene according to Diels-Alder with acrylic acid vinyl ester. Alternatively, the hexachlorcyclopentadiene may be reacted according to Diels-Alder with acrylic acid and the resultant 1,4,5,6,7,7-hexachlorbicyclo-(2,2,1)-heptene-(5)-2-carboxylic acid vinylated with acetylene in the presence of a compound of a metal of group IIB of the periodic system.

The reaction of the hexachlorcyclopentadiene with acrylic acid vinyl ester or acrylic acid is carried out in the manner known for Diels-Alder syntheses, for example by reaction of the initial materials at elevated temperature, for example at temperatures between 70° and 200° C. It is preferable to work in the presence of a small amount, e.g. 0.001 to 0.1% by weight of a polymerization inhibitor, such as hydroquinone, phenothiazine or para-tertiary-butylcatechol. The reaction may also be carried out in the presence of solvents having a boiling point higher than the reaction temperature, as for example toluene, xylene, or dimethylcyclohexane. The Diels-Alder adducts obtained can be purified by simple distillation under reduced pressure or by recrystallization.

The free acid obtained by reaction of hexachlorcyclopentadiene with acrylic acid can be vinylated with acetylene at elevated temperature and under increased pressure, for example at 120° to 220° C. and 2 to 28 atmospheres. By diluting the acetylene with inert gases, e.g. nitrogen, carbon dioxide or noble gases, it is also possible to apply higher pressures. In this case, pressures at which the acetylene exerts a partial pressure of from 2 to 28 atmospheres produced satisfactory results. The reaction with acetylene is preferably carried out in the liquid phase at temperatures above the melting point of the acid, i.e. above 181° to 182° C. In the presence of solvents, as for example xylene or dimethylcyclohexane, the reaction may also be carried out at lower temperatures, as for example at 130° to 190° C. It is also possible to vinylate in the vapor phase, the acid preferably being vaporized in vacuo and led over the catalyst together with the acetylene.

Examples of vinylation catalysts are the oxides, carbonates, acetates or halides, i.e. the chlorides, bromides and iodides of zinc, cadmium and mercury or mixtures of these compounds, preferably in amounts of 0.1 to 3% by weight with reference to the 1,4,5,6,7,7-hexachlorbicyclo-(2,2,1)-heptene-(5)-2-carboxylic acid. The catalysts may also be applied to carriers, e.g. alumina and silicon dioxide.

The 1,4,5,6,7,7 - hexachlor-bicyclo-(2,2,1)-heptene-(5)-2-carboxylic acid vinyl ester obtained according to the said process is polymerizable in the presence of polymerization catalysts and may also be copolymerized with other monomers. The ester is also a valuable intermediate product for the production of plant protection agents. The pure compound can be polymerized to form an excellent material for the production of difficultly flammable car finishes. The homopolymers also lend themselves for use as flame-resistant varnishes for the protection of wooden constructions.

The following examples will further illustrate this invention but the invention is not restricted to these examples.

Example 1

104 grams of 1,4,5,6,7,7 - hexachlor-bicyclo - (2,2,1)-heptene-(5)-2-carboxylic acid, 1.0 gram of zinc acetate and 0.1 gram of para-tertiary-butyl pyrocatechol are charged into a shaking autoclave of 250 ml. capacity. The contents of the autoclave are then heated to 185° C. At an acetylene pressure of 25 atmospheres, the acetylene used up is replaced at half-hourly intervals. The reaction is ended after 6 hours. The contents of the shaking autoclave, which are viscous at room temperature, are subjected to a vacuum distillation. The vinyl ester distils over at 113° C. at 0.01 mm. Hg and is a colorless oil which solidifies after some time. The compound has the following constitution:

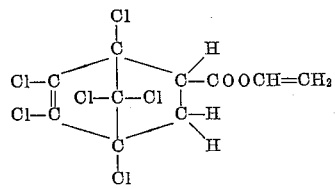

The yield is 94 grams, i.e. 84% of the theory.

The 1,4,5,6,7,7 - hexachlor-bicyclo-(2,2,1)-heptene-(5)-2-carboxylic acid used as initial material is obtained in known manner by reaction of hexachlorcyclopentadiene with acrylic acid in the mol ratio of about 1:1 at elevated temperature, such as 140° C., preferably in xylene as solvent. The acid obtained in this way can be directly used without any further purification.

Example 2

A mixture of 274 grams of hexachlorcyclopentadiene, 98 grams of vinyl acrylate and 0.5 gram of para-tertiary-butyl pyrocatechol (as stabilizer) is heated for 3 hours at 90° C. while stirring in a 500 ml. three-necked flask with a stirrer and reflux condenser. Then the contents, which have become viscous, are subjected to a vacuum distillation. 356 grams of 1,4,5,6,7,7-hexachlor-bicyclo-(2,2,1)-heptene-(5)-2-carboxylic acid vinyl ester of the boiling point 119° to 121° C. at 0.1 mm. Hg are obtained; after some time it solidifies and has a melting point of 44° C. The yield is 95.5% of the theory.

We claim:

The vinyl ester of 1,4,5,6,7,7-hexachlor-bicyclo-(2,2,1)-heptene-(5)-2-carboxylic acid of the formula,

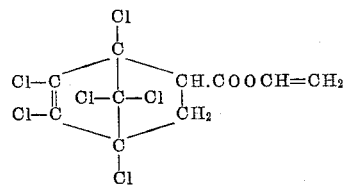

References Cited in the file of this patent

UNITED STATES PATENTS

| | | |
|---|---|---|
| 2,537,845 | Morris | Jan. 9, 1951 |
| 2,779,701 | Robitschek et al. | Jan. 29, 1957 |
| 2,794,827 | Stanton et al. | June 4, 1957 |
| 2,810,712 | Baranauckas | Oct. 22, 1957 |
| 2,839,553 | Soloway | June 17, 1958 |

OTHER REFERENCES

Wagner et al., Synthetic Organic Chemistry (New York, 1953), pages 491–492.